United States Patent
Bei et al.

(10) Patent No.: US 6,937,709 B2
(45) Date of Patent: Aug. 30, 2005

(54) FAX TRANSMISSION OVER CONGESTED OR CORRUPTED WIDEBAND NETWORK, OR NARROWBAND NETWORK, USING ECM ERROR BLOCK FLOW CONTROL

(75) Inventors: JianWei Bei, Rockville, MD (US); Mehrdad Abrishami, Gaithersburg, MD (US); Abhinandan Dodamani, Germantown, MD (US); Richard Meyers, Montgomery Village, MD (US)

(73) Assignee: LSI Logic Corporation, Milpitas, CA (US)

( * ) Notice: Subject to any disclaimer, the term of this patent is extended or adjusted under 35 U.S.C. 154(b) by 977 days.

(21) Appl. No.: 09/779,749

(22) Filed: Feb. 9, 2001

(65) Prior Publication Data

US 2003/0099338 A1 May 29, 2003

Related U.S. Application Data

(60) Provisional application No. 60/182,110, filed on Feb. 11, 2000.

(51) Int. Cl.[7] ............................................. H04M 11/00
(52) U.S. Cl. ............................ 379/100.01; 379/100.06; 379/100.17
(58) Field of Search ..................... 379/100.01, 100.06, 379/100.09, 100.17; 370/229, 232, 352, 353, 356, 461; 358/403, 434–439

(56) References Cited

U.S. PATENT DOCUMENTS 6,483,600 B1 * 11/2002 Schuster et al. ........... 358/1.15
6,501,790 B1 * 12/2002 Livshin ..................... 375/222

FOREIGN PATENT DOCUMENTS

JP          406152513     *  5/1994     ............ H04B/7/26

* cited by examiner

Primary Examiner—Melur Ramakrishnaiah
(74) Attorney, Agent, or Firm—Trexler, Bushnell, Giangiorgi, Blackstone & Marr, Ltd.

(57) ABSTRACT

A method and apparatus for maintaining a fax transmission over a relay network that includes at least first and second portions and a relay portion that couples the first and second portions to each other. At a second gateway connecting the second portion to the relay portion, data frames received over the relay portion are processed to determine if they are corrupted, and signals are sent back to a first gateway to resend any data frames that are corrupted. The first gateway connects the first portion to the relay portion.

25 Claims, 5 Drawing Sheets

FAX TRANSMISSION OVER CONGESTED OR CORRUPTED WIDEBAND NETWORK, OR NARROWBAND NETWORK, USING ECM ERROR BLOCK FLOW CONTROL

CROSS REFERENCE TO RELATED APPLICATIONS

The present application is related to and claims priority to co-pending U.S. Provisional application Ser. No. 60/182,110, filed Feb. 11, 2000. The contents of that provisional application are incorporated in their entirety herein by reference.

FIELD OF THE INVENTION

The present invention relates to a method and apparatus for maintaining a fax transmission over a communications path that includes a network path that is data rate constricted and/or that has corrupted the data passing therethrough (e.g., jitter introduced by the network), by using error correction mode (ECM) error block flow control. In particular, the present invention relates to a method and apparatus for maintaining a fax transmission even though a data bottleneck exists somewhere between a source and destination fax machine, which might otherwise cause the fax transmission to cease due to excessive time delay and/or jitter brought about by the bottleneck.

DESCRIPTION OF THE RELATED ART

In its T.30 and T.4/T.6 standards, the Telecommunications Standardization Section of the ITU (ITU-T) has defined procedures for facsimile transmission of documents in a public switched telephone network (PSTN). The T.30 and T.4/T.6 standards define a Group 3 facsimile service, also known as Group 3 FAX and G3 FAX. The recommendation is for a "Group 3 facsimile apparatus." A Group 3 facsimile apparatus includes any one of (1) a facsimile machine, (2) a computer with a facsimile modem and corresponding software, and (3) other similar products. As referred to herein, the term "facsimile machine" or "fax machine" applies to any Group 3 facsimile apparatus.

The T.30 standard was written for a facsimile provided over a wired telephone network, a PSTN, or a digital encoding of the analog signal (e.g., using PCM). However, in a network in which channels are assigned low rate digital streams (e.g., a TDMA system or a packet-based system with limited bandwidth), other techniques are used to send a facsimile in real-time.

One method of supporting Group 3 FAX over bandwidth-limited digital networks uses a facsimile relay system to (1) demodulate the analog facsimile signal, (2) transmit the digital data using the digital network, and (3) remodulate the signal at the other relay station to provide an analog signal. In such a system, in addition to demodulating and remodulating the facsimile signal, the T.30-based relay protocol is implemented in the relay gateways.

Figure 1:
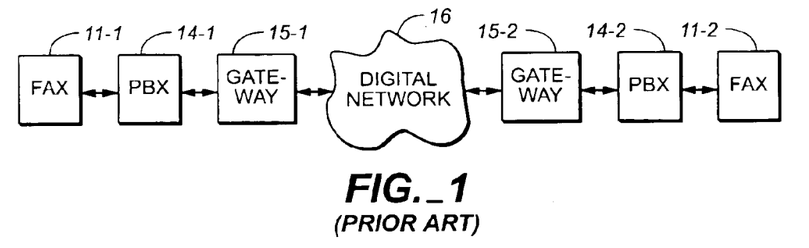
FIG. 1 shows a conventional fax transmission path between faxes, in which a narrowband relay network is utilized somewhere along the transmission path.

FIG. 1 shows a system by which two faxes communicate with each other, whereby a digital network is utilized in the communications path between the two faxes. A first fax machine 11-1 is communicatively connected to a first private branch exchange (PBX) 14-1, whereby the PBX 14-1 is communicatively connected to a first gateway processor 15-1. The PBX 14-1 may alternatively be a PSTN or a plain old telephone system (POTS). The first gateway processor 15-1 provides a connectivity with a narrowband network 16, which is shown as a digital network in FIG. 1. For example, the digital network may be a packet network.

Fax data is typically transmitted over conventional analog telephone lines. Then this analog signal is converted into the digital format at the central office or PBX, using 64K bit-per-second pulse code modulation (PCM). To reduce the bandwidth, the PCM-modulated fax data needs to be demodulated, by the first gateway 15-1, so that the demodulated digital data can be output in packets of data over the digital network 16.

A second gateway 15-2 provides a communicative connection to a second PBX 14-2, which itself provides a communicative connection to a second fax 11-2. Like the first PBX 14-1, the second PBX 14-2 may alternatively be a PSTN or a POTS. The second gateway 15-2 receives demodulated digital data from the digital network 16 in packet form, and re-modulate the digital data into the PCM coded analog signal. The PCM data is then sent over the second PBX 14-2, whereby it is received by the second fax 11-2.

The digital network 16 is typically of a narrower bandwidth than the PCM coded analog portions (PBX 14-1, 14-2) of the communications path between the first and second faxes 11-1, 11-2. As such, a problem exists in that the digital network 16 may become a bottleneck with respect to fax data being sent between the first and second faxes 11-1, 11-2. Alternatively, the digital network 16 may be a wideband network, which is currently experiencing a bandwidth restriction due to excess traffic passing through the digital network.

If the channel rate or packet throughput of the digital network 16 is equal to or greater than the native fax rate (e.g., 2400, 4800, 9600, or 14,400 bps) between the first and second faxes 11-1, 11-2, a demodulation-remodulation relay may be used. However, a problem may arise when the channel rate or packet throughput is less than the native rate of the fax machines. As discussed above, this may lead to delays in the fax transmission, which may in turn cause the fax transmission to cease due to too much time between receipt of fax data at the fax machines.

SUMMARY OF THE INVENTION

The present invention provides a method and apparatus for maintaining a fax transmission between faxes, in which a network that is currently causing a data rate reduction or that has corrupted the data passing therethrough is utilized somewhere in the communications path between the faxes.

According to one aspect of the invention, there is provided a method of fax transmission over a fax relay network that includes at least an analog portion and a digital portion of the fax relay network. The method includes receiving, at a first data gateway that communicatively connects a sending fax machine to the digital portion of the fax relay network, image data from the sending fax machine. The method also includes converting the image data into digital data to be sent over the digital portion of the fax relay network. The method further includes storing the digitized image data in a buffer at the first data gateway. The method still further includes outputting the digitized image data in accordance with a data rate of the digital portion of the fax relay network, the digitized image data being received by a second data gateway on the digital portion of the fax relay network, the second data gateway communicatively connecting a receiving fax machine to the digital portion of the fax relay network. The method also includes determining an amount of data stored in the buffer at the first data gateway. If the determination made of the amount of data stored in the buffer is that the amount of data stored in the buffer is greater than a particular amount of data, sending a data resend signal to the sending fax machine. The sending and receiving fax machines both operate in an error correction mode in which data is resent upon request.

According to another aspect of the invention, there is provided a method of fax transmission over a fax relay network that includes at least a wideband portion and a narrowband portion. The method includes receiving, at a first data gateway that communicatively connects a sending fax machine to the narrowband portion of the fax relay network, image data from the sending fax machine. The method also includes storing the image data in a buffer at the first data gateway. The method further includes outputting the image data in accordance with a data throughput rate of the narrowband portion of the fax relay network, the image data being received by a second data gateway on the narrowband portion of the fax relay network, the second data gateway communicatively connecting a receiving fax machine to the narrowband portion of the fax relay network. The sending and receiving fax machines both operate in an error correction mode in which data is resent upon request.

According to another aspect of the invention, there is provided an apparatus for facilitating fax transmission between a sending fax machine and a receiving fax machine over a fax relay network, the fax relay network including at least an analog portion and a digital portion. The apparatus includes an input port for receiving image data sent from the sending fax machine. The apparatus also includes a conversion unit that converts the image data into digital data to be sent over the digital portion of the fax relay network. The apparatus further includes a storing unit that stores the digitized image data and that outputs a signal indicative of a particular amount of data currently stored in the storing unit. The apparatus still further includes a control unit for controlling output of the digitized image data stored in the storing unit in accordance with a data rate of the digital portion of the fax relay network and the signal output by the storing unit.

According to yet another aspect of the invention, there is provided an apparatus for facilitating fax transmission between a sending fax machine and a receiving fax machine over a fax relay network, the fax relay network including at least a wideband portion and a narrowband portion. The apparatus includes an input port for receiving image data sent from the sending fax machine. The apparatus also includes a storing unit that stores the image data and that outputs a signal indicative of a particular amount of data currently stored in the storing unit. The apparatus further includes a control unit for controlling output of the image data stored in the storing unit in accordance with a data rate of the narrowband portion of the fax relay network and the signal output by the storing unit.

BRIEF DESCRIPTION OF THE DRAWINGS

The invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

Preferred embodiments of the present invention will be described in detail hereinbelow, with reference to the drawings.

The present invention relates to a method and apparatus whereby real-time fax is transmitted through a channel lower in rate than the fax transmission rate (or native rate), by utilizing an error correction mode (ECM) of the fax machines to maintain a fax transmission. Also, the present invention relates to a method and apparatus whereby real-time fax is transmitted through a channel that is not lower in rate than the fax transmission rate, but whereby the channel introduces errors in the data passing through the channel, or whereby congestion in the network causes reduced channel throughput to result in data traveling through the channel at less than the native rate.

Users typically want real-time fax transmissions instead of delayed store-and-forward fax transmissions. However, the channels or packet throughput to transmit the fax image needs to be of sufficient size in order to make the real-time fax transmissions possible. The present invention allows a fax image to be transmitted at full speed, but allows for a "throttling" operation to be performed over a channel that is part of the communications path between sending and receiving fax machines. This throttling operation allows for the saving of valuable bandwidth and prevents network congestion in the network in which the channel is a part of.

A typical example of this is a network which usually runs voice and has an 8 Kbps G.729 standard. In this case, there is no feasible way to run full speed, real-time fax, through this network, and the penalty to increase the channel to accommodate a 9600 bps or 14.4 Kbps fax transmission speed may be severe. The present invention allows for such full speed, real-time fax over narrowband or wideband relay networks, as will be explained in detail below.

Figure 2:
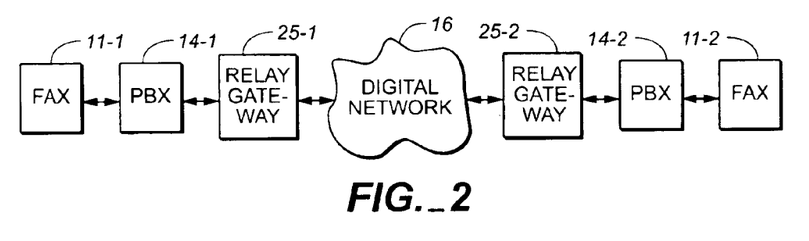
FIG. 2 shows a fax transmission path between faxes, in which a relay network is utilized somewhere along the transmission path, according to a first embodiment of the invention.

FIG. 2 shows a system according to a first embodiment of the invention. FIG. 2 is similar to FIG. 1, but with a first relay gateway processor 25-1 and second relay gateway processor 25-2 utilized instead of the first gateway processor 15-1 and the second gateway processor 15-2. In FIG. 2, fax machine 11-1 corresponds to a sending fax machine, and fax machine 11-2 corresponds to a receiving fax machine. In the first embodiment, fax machine 11-1 starts out in the ECM mode, and sends out a T.30 fax sequence to the first relay gateway processor 25-1 (by way of PBX 14-1). The first gateway processor 25-1 demodulates the PCM-encoded data received from the fax machine 11-1, and converts it to digital data, to be sent in packet form over the digital network 16. The PCM-encoded data may be an HDLC frame structure according to the T.30 standard, which is output by the sending fax machine 11-1. The ITU Recommendation T.30 describes the HDLC frame structure used by fax machines. Alternatively, other types of frame structures beyond the HDLC frame structure described in the T.30 standard may be utilized, while remaining within the scope of the invention.

The first relay gateway processor 25-1 mediates the fax protocol procedural signals during an initial negotiation with the second relay gateway processor 25-2 and furthermore to the fax machine 11-2 which is also in the ECM mode, in order to set Up a channel and data rate for the fax image transmission between the faxes 11-1, 11-2. This negotiation phase is called "Phase B" protocol handshaking in the T.30 standard.

In the first embodiment, both the first relay gateway processor 25-1 and the second relay gateway processor 25-2 have data bluffers, for temporarily storing fax image data, in digitized form, at those respective locations. The first relay gateway processor 25-1 stores fax data, which it demodulates the PCM coded analog signal from the fax machine 11-1 into digital data form. The second relay gateway processor 25-2 stores fax data, which it obtains from the digital network 16, to be eventually sent (in PCM-encoded form, sent out as HDLC frames) to the fax machine 11-2.

If the fax transmission rate is low enough, then there will typically be no bottlenecks in the system, and the fax transmission between the fax machines 11-1, 11-2 will start and end with no problem. However, if the negotiated fax transmission rate is higher than the channel rate or packet throughput of the digital network 16, then at some point during the fax transmission, there will be a backup of data, whereby the second relay gateway processor 25-2 will be waiting for data to be provided to it from the digital network 16, and where the fax transmission may be canceled or corrupted due to the excessive delay in providing fax data to the fax machine 11-2 during the fax transmission.

Figure 3:
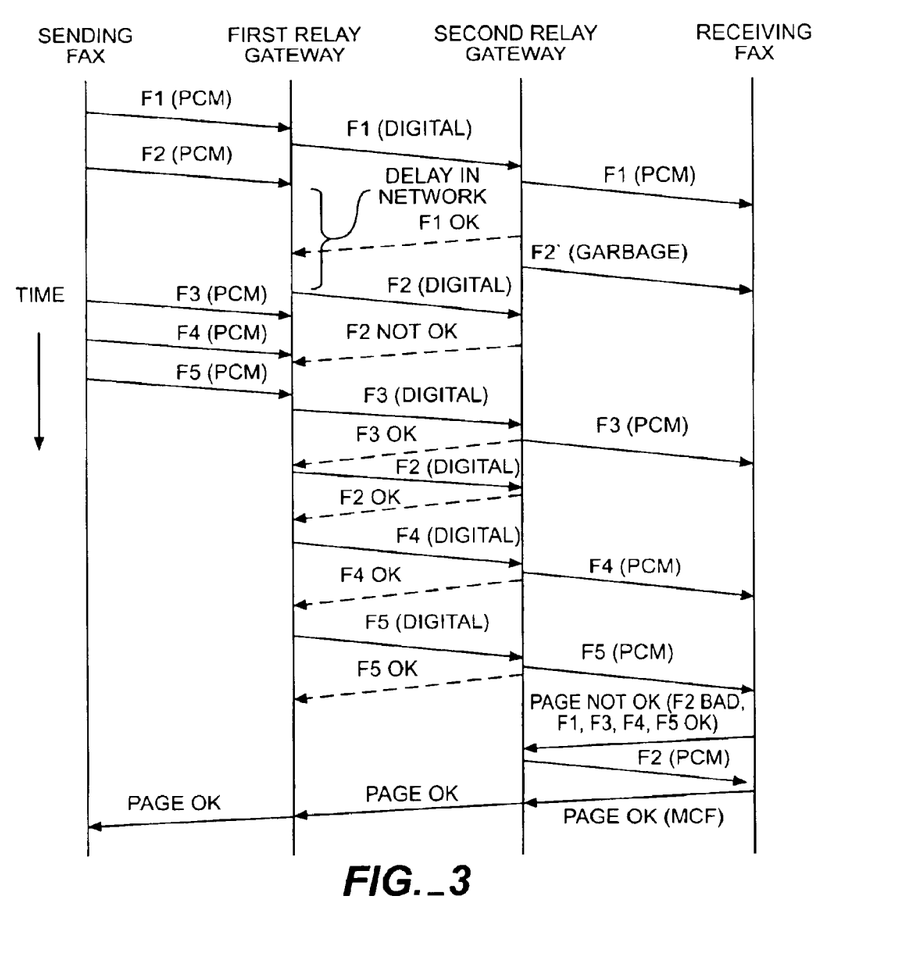
FIG. 3 shows paths of fax transmission signals according to the first embodiment of the invention.

FIG. 3 shows a procedure to maintain a fax transmission according to the first embodiment of the invention, whereby spoofing signals are sent out by the first and second relay gateway processors 25-1, 25-2, to their near end fax machine as needed, in order to maintain a fax transmission. Also, the first and second relay gateway processors 25-1, 25-2 communicate with each other on a frame-by-frame basis, whereby the second relay gateway processor 25-2 informs the first relay gateway processor 25-1 as to whether or not it correctly received each frame of data obtained from the network 16 (as determined by a CRC check preformed on each frame by the second relay gateway processor 25-2).

In FIG. 3, the sending fax and the receiving fax have already negotiated their fax transmission rate, and the sending fax has already started sending image data (e.g., data frame F1) to the receiving fax. Details of how faxes negotiate a fax transmission are know to those skilled in the art (see ITU T.30 specification, for example), and are not described herein in order to not obfuscate the description of the present invention.

In a typical fax error correction mode (ECM), fax data is sent between faxes, whereby if the receiving fax does not receive one or more frames of data correctly in a page of data, it will notify the sending fax after receiving the entire page of data. This notification, when received by the sending fax, will cause the sending fax to resend the requested frames of data again. The present invention utilizes the error correction mode to maintain a fax transmission between faxes in a system that utilizes a relay network, such as a digital packet network, a frame relay network, or a TDMA network, disposed somewhere along a fax transmission path between the faxes. The relay network may be a narrowband network, or it may be a wideband network that is currently experiencing congestion or corruption of data within that network.

In FIG. 2, the first relay gateway processor 25-1 receives the image data (provided in HDLC frames) from the sending fax 11-1 (over a PSTN or PBX, for example). The first relay gateway processor 25-1 demodulates that PCM-encoded image data into digital data, and sends the digital image data in packet form over the digital network 16. The second relay gateway processor 25-2 receives the digital image data in packet form over the digital network 16, re-modulates that digital data into PCM-encoded image data (provided in HDLC frames), and provides the PCM-encoded image data to the receiving fax machine 11-2. The first relay gateway processor 25-1 has a data buffer to temporarily store image data, in digital form, that it receives from the sending fax machine 11-1.

As seen in FIG. 3, the second relay gateway processor 25-2 receives a first frame of data F1 over the digital network, re-modulates converts the first frame of data F1 into PCM-encoded format, and sends the PCM-encoded data to the receiving fax machine 11-2. As shown in FIG. 3, a second frame of data F2 is delayed from being sent out over the digital network 16, and thus is delayed from being received by the second relay gateway processor 25-2. This delay may be due to constraints of the digital network 16, such as its narrow bandwidth and/or other digital traffic also utilizing the digital network 16 at the same time (thereby causing congestion within the digital network 16).

Delay between the first and second relay gateway processors 25-1, 25-2 may also occur as data transmission speed is slowed tip within the digital network 16 itself, due to network congestion or the like, as data is propagating from the first relay gateway processor 25-1 to the second relay gateway processor 25-2. For example, even though the first relay gateway processor 25-1 may have sent out the second frame of data F2 over the digital network as soon as it received it from the first fax machine 11-1 and converted it into digital packets, that second frame of data F2 is delayed from being received at the second relay gateway processor 25-2 due to bottlenecks within the digital network 16. This delay, if not dealt with, may cause the fax transmission to hang up, for certain kinds of fax machines that have little tolerability for fax transmission delays.

The present invention deals with these various types of delay and maintains the fax transmission. In particular, the second relay gateway processor 25-2 monitors the integrity of the data that it receives over the digital network 16. One way of doing this is by having the second relay gateway processor 25-2 monitor the amount of data currently stored within its buffer, so as to determine whether the data-input rate from the digital network 16 to the second relay gateway processor 25-2 is acceptable (and not too much slower than the data-output rate from the second relay gateway processor 25-2 to the receiving fax machine 11-2). When the buffer at the second relay gateway processor 25-2 is low in data (e.g., less than a 20% full condition), and whereby the second relay gateway processor 25-2 has not yet received the second data frame F2 from the digital network 16 (after having received and sent out the first date frame F1 in PCM-encoded form to the receiving fax machine 11-2), the second relay gateway 25-2 outputs "garbage data" (e.g., 10101010101 . . . or some random stream of 1s and 0s, as generated at the second relay gateway processor 25-2), as a second data frame F2', to the receiving fax machine 11-2. The second relay gateway processor 25-2 provides "garbage" error check bits in the garbage data frame F2' to ensure that the garbage data frame F2' will not pass an error check at the receiving fax machine 11-2.

While the second relay gateway processor 25-2 is waiting for the correct second frame of data F2 over the digital network 16, after having sent out the garbage second frame of data F2', it sends out a plurality of synchronization flags (Sync flags) to the receiving fax machine, to thereby gain some more time to hopefully obtain a third frame of data F3 that is being delayed due to congestion or other problems in the digital network 16. Typically, one or two synchronization flags (7E 7E hexadecimal) are sent out between consecutive frames of data in a single page of image data. However, in the present invention, the second relay gateway processor 25-2 sends out many synchronization flags after the garbage second frame of data F2' has been sent out, while awaiting the next frame of data from the digital network 16. In the T.30 protocol, synchronization flags can be sent consecutively for several seconds, thereby buying more time for the second relay gateway processor 25-2. The receiving fax machine 11-2 waits for the next frame of data (e.g., the third frame of data F3), while continuing to receive the HDLC synchronization flags. If a certain period has elapsed and the third frame of data F3 has not been received as yet by the second relay gateway processor 25-2 over the digital network 16, another garbage frame of data F3' may be created and sent out by the second relay gateway processor 25-2. In the present invention, the second relay gateway processor 25-2 checks each frame of data received over the digital network 16 (as sent to it by the first relay gateway processor 25-1), in order to determine whether the received data is corrupted. The corruption could be due to bit error, frame loss, excessive, jitter or other types of data corruption problems on the digital network 16. If the error check (e.g., CRC) of a data frame indicates that the received data frame is bad, the second relay gateway processor 25-2 outputs a control signal to the first relay gateway processor 25-1 over the digital network 16, to request that the bad data frame be resent to it over the digital network 16.

Thus, even in a case whereby the second relay gateway processor 25-2 has received the second frame of data over the digital network 16 in a timely fashion, but where the second frame of data does not pass an error check as performed by the second relay gateway processor 25-2, the sending of a control signal to the first relay gateway processor 25-1 from the second relay gateway processor 25-2 will expedite the process for resending of the data, without waiting for the receiving fax machine 11-2 to have to make such a request.

Since the receiving fax machine 11-2 is in the error correction mode, it will receive the garbage data frame F2', attempt to decode it, and fail, since the data is garbage data and is not real data with real error check bits. The error check performed at the receiving fax machine 11-2 will result in a determination that errors exist in the received garbage data frame F2'. After receiving a full page of data (that includes multiple HDLC frames), the receiving fax machine 11-2 will output a signal to the sending fax machine 11-1, notifying it that the second frame of data F2' that it received was corrupted, and that the second frame of data needs to be resent to the receiving fax machine 11-2. That signal, called a partial page request (PPR) signal in the T.30 standard, also indicates which HDLC frames were properly received by the receiving fax machine 11-2 for the current page of image data. For example, if a page of data corresponds to five HDLC frames F1 through F5, the PPR signal output by the receiving fax machine 11-2 may indicate that frames F1, F3, F4 and F5 are OK, but that frame F2 is bad and needs to be resent to it.

The PPR signal sent by the receiving fax machine 11-2 is received by the second relay gateway processor 25-2, which does not forward the signal to the sending fax machine 11-1. The second relay gateway processor 25-2 checks its internal data buffer to see whether it contains correct second frame. If it is true, it sends the correct second frame to the receiving fax machine 11-2. If it does not contain the correct frame two, the second relay gateway send the request to the first relay gateway in a request for the frame two does not send out before. At the same time, the second relay gateway send a frame with bad CRC to the receiving fax machine again, so that the protocol proceeds. This procedure will continue until a correct frame two is received from the first gateway.

As stated above, the first relay gateway processor 25-1 receives signals from the second relay gateway processor 25-2 as to the status of each data frame sent to the second relay gateway processor 25-2 over the digital network 16. These signals provide for a full-duplex, real-time fax transmission scheme between the first and second relay gateway processors 25-1, 25-2. This relay-time fax transmission scheme is capable of immediately responding to changes in the digital network 16, whereby congestion starts to occur or whereby congestion starts to go away within the digital network 16.

When a data frame is requested to be resent over the digital network 16, as requested by the second relay gateway processor 25-2, the first relay gateway processor 25-1 first checks to see if the requested frame of data is currently stored in its buffer. If so, and if the requested frame of data passes an error check, that data is sent out over the digital network 16. In this case, the error was most likely due to bit error or packet loss in the digital network 16, which somehow corrupted the data before it was received by the second relay gateway processor 25-2. If, however, the check performed on the requested data frame by the first relay gateway processor 25-1 indicates that errors exist in the data frame, or if the requested data is no longer stored in the buffer at the first relay gateway processor 25-1, the first relay gateway processor 25-1 must obtain the data from the sending fax machine 11-1. This request to the sending fax machine occurs at the end of a page of data being sent by the sending fax machine 11-1, whereby the sending fax machine awaits receipt of either a MCF signal (page received OK) or PPR signal (one or more HDLC frames in the page need to be resent due to errors in those one or more HDLC frames). Thus, in the cases whereby the requested data is stored at the first relay data gateway 25-1 but is no good or is no longer stored there, the first relay data gateway 25-1 waits until it receives notifications from the second relay data gateway 25-2 as to each HDLC frame in the current page of image data, and from those notifications, it prepares and outputs a PPR signal to the sending fax machine 11-1. Note that this PPR signal does not originate at the receiving fax machine 11-2, but rather is created at the first relay gateway processor 25-1 based on information sent to it by the second relay gateway processor 25-2.

Figure 6:
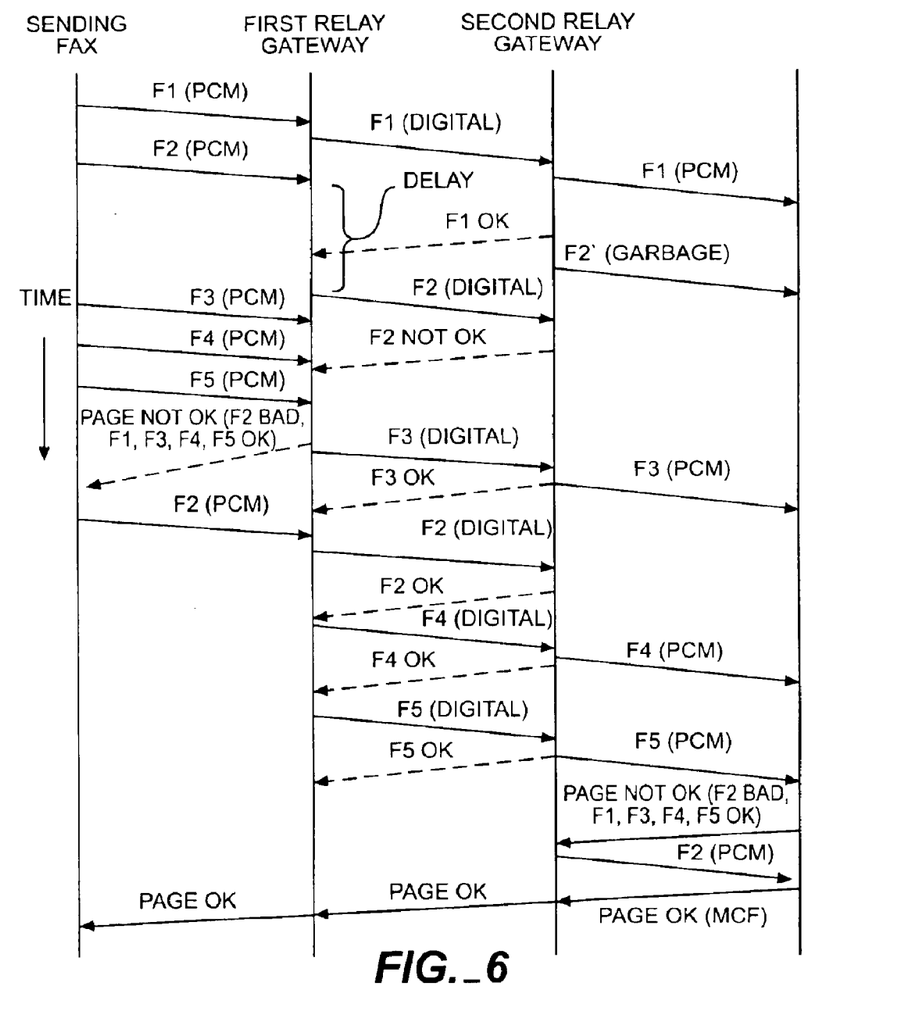
FIG. 6 shows paths of fax transmission signals according to the first embodiment of the invention, in which a frame of data being requested by the receiving side relay gateway processor is not currently available at the sending side relay gateway processor.
Figure 7:
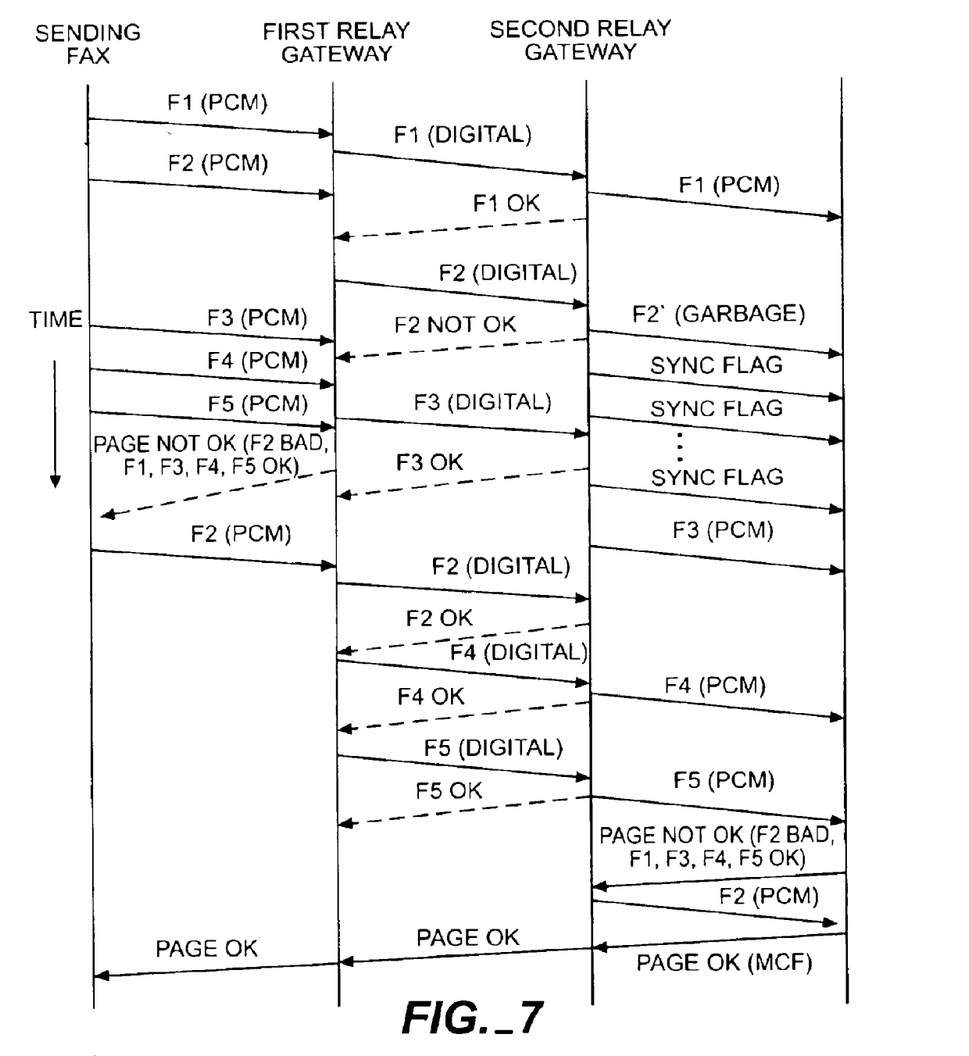
FIG. 7 shows paths of fax transmission signals according to the second embodiment of the invention, in which many synchronization flags are sent out by the receiving side relay gateway processor in order to maintain a fax transmission.

FIG. 6 shows the sequence of signals being sent according to the first embodiment of the invention, when the second relay gateway processor 25-2 receives a second frame of data with errors, and whereby the first relay gateway processor 25-1 does not have the requested data and must request it from the sending fax machine 11-1, at the end of a page transmission by the sending fax machine 11-1.

It is possible that the second relay gateway processor 25-2 receives a third frame of data F3 over the digital network 16, before it receives the second frame of data F2 over the digital network 16. In that case, the second relay gateway processor 25-2 will re-modulate garbage data F2' to the receiving fax machine 11-2 as a substitute for the second frame of data F2, and it will re-modulate the correct third frame of data F3 to the receiving fax machine 11-2. The receiving fax machine 11-2 will receive and decode both received frames F2' and F3, will determine that the second frame F2' was corrupted, and will request a resend of the second frame of data (in a PPR signal) after having received an entire page of image data corresponding to a plurality of frames of data. Once the second relay gateway processor 25-2 receives the second frame of data F2 over the digital network 16 (and after the second relay gateway processor 25-2 has received a PPR signal from the receiving fax machine 11-2 indicating that the second frame of data of the current page of data sent to it is no good), it will send the correct second frame of data F2 to the receiving fax machine 11-2.

Figure 4:
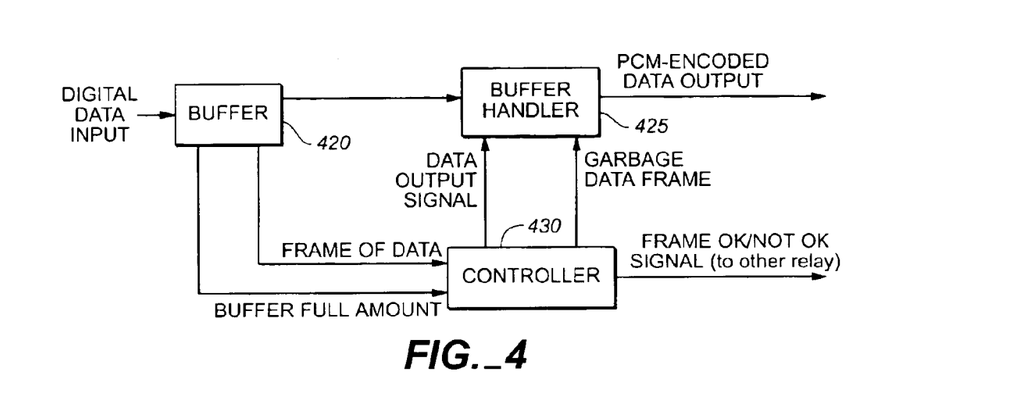
FIG. 4 shows elements making up one possible configuration of a relay gateway processor on the receiving gateway side, which may be utilized in the system and method according to the first embodiment of the invention.

The second relay gateway processor 25-2 according to the first embodiment has a buffer for storing data received from the digital network 16, so that it can later send that data to the receiving fax machine 11-2. FIG. 4 shows one configuration of the second relay gateway processor 25-2, whereby it includes a buffer 420, a buffer handler 425, and a controller 430. The controller 430 outputs frame OK/Not OK signals to the other relay gateway processor 25-1, based information provided to it by the buffer 420 (CRC). The controller 430 may have, in one possible configuration, a random number generator, for creating the garbage data. For example, a random number generator that outputs a random number from 0 to 99 can be used, whereby a value from 0 to 49 results in a "0" garbage bit, while a value from 50 to 99 results in a "1" garbage bit for a garbage data frame.

The buffer handler 425 reads the data from the buffer 420, and puts the data into a packet format, to be output over the digital network 16 when the bandwidth is available in the digital network 16. For other types of relay networks, the buffer handler 425 puts the data in the proper format to be sent over the relay network according to the protocol used by the network, and sends out the data when the bandwidth is available.

In the scenario described above, if the second relay gateway processor 25-2 sends out garbage data as a second frame of data F2' and sends out correct data as a third frame of data F3 to the receiving fax machine 11-2, the second relay gateway processor 25-2 has to wait until the receiving fax machine 11-2 outputs a request signal for the second frame, where the resent is sent out via a PPR signal. Once the PPR signal is received by the second relay gateway processor 25-2, it can then output a second frame of data F2 that it received over the digital network 16.

A size of the buffer 420 at the second relay gateway processor 25-2 is small, but preferably large enough to be able to store one of image data two or three pages of data (e.g., storage capability of 50–70 Kbytes). A similar-sized buffer exists at the first relay gateway processor 25-1.

For each page of image data received by the receiving fax machine 11-2, it outputs a control signal indicating whether or not the page of data was correctly received or contained errors in one of more frames of that page of data. These control signals make their way to the sending fax machine 11-1, by way of the second relay gateway processor 25-2, the digital network 16, the first relay gateway processor 25-1, and any networks (e.g., first and second PBXs) between the fax machines and the gateway processors.

Figure 5:
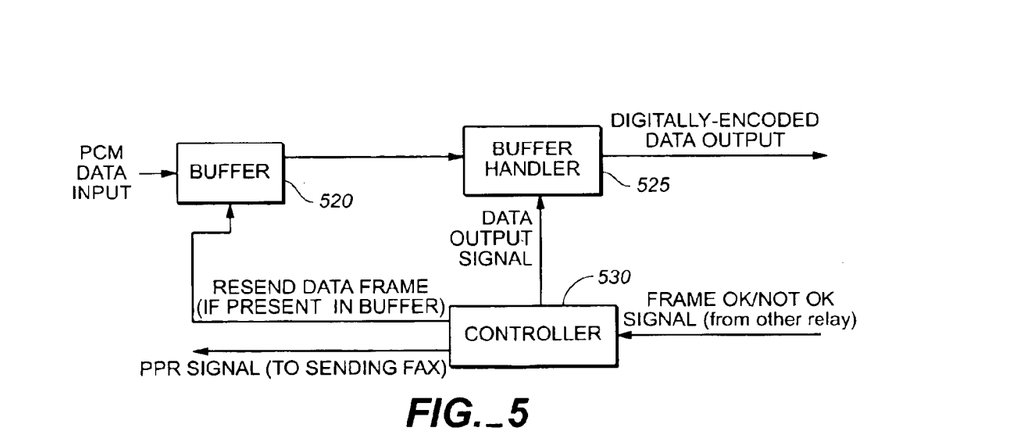
FIG. 5 shows elements making up one possible configuration of a relay gateway processor on the sending gateway side, which may be utilized in the system and method according to the first embodiment of the invention.

FIG. 5 shows elements making up a first relay gateway processor 25-1, according to the first or second embodiments of the invention. The first relay gateway processor 25-1 includes a buffer 520, a buffer handler 525, and a controller 530. The controller receives the frame OK/Not OK signals from the second relay gateway processor 25-2, and determines whether or not a requested data frame is currently stored in the buffer 520. If so, then the requested date frame is output from the buffer to the buffer handler 525, under control of the controller 530, and the data frame is converted to a data packet or packets and sent out over the digital network 16. If not, then the controller 530 sends out a PPR signal to the sending fax machine 11-1 in the form of a control packet, with the PPR signal requesting the data frame from the sending fax machine 11-1. The PPR signal is sent out by the controller 530 only after the sending fax machine 11-1 has finished sending a page of data. The sending fax machine 11-1 responds to the PPR signal, which it thinks was sent out by the receiving fax machine 11-2, and it outputs the requested data frame. The first relay gateway processor 25-1 processes the requested data frame and sends it out in digital form over the digital network 16, whereby it is received by the second relay gateway processor 25-2.

Figure 8:
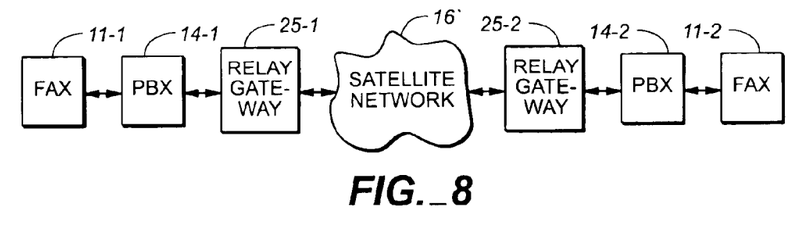
FIG. 8 shows a fax transmission path between faxes, in which a narrowband satellite network is utilized somewhere along the transmission path, according to a third embodiment of the invention.

FIG. 8 shows a third embodiment of the invention, in which a relay network 16' in the fax transmission path is a satellite transmission path, and whereby the limited bandwidth of the satellite transmission path may cause bottlenecks to occur in the fax transmission. Similar to the first and second embodiments, any bottlenecks that may occur due to limited bandwidth over the satellite transmission path, are taken care of by the first and second relay gateway processors 25-1, 25-2 sending out spoofing signals, as required, in order to maintain the fax transmission.

At the end of a page of image data, before the first relay gateway processor 25-1 receives the MCF control signal, the first relay gateway processor 25-1 will send either of the following signals to the sending fax machine 11-2 in accordance with the T.30 protocol:

1. Send partial page request (PPR) to the sending fax machine 11-1 if there are some error frames found. The PPR contains information about which frames are not received correctly.
2. The sending fax machine 11-1 resends the frames that are indicated in the PPR if the first relay gateway processor does not have the requested data and must request it from the sending fax machine 11-1. If the first relay gateway processor 25-1 does have the requested frames stored in its buffer, it sends the requested frames to the second relay gateway processor 25-2 without having to request that data from the sending fax machine 11-1.
3. The procedure in steps 1) and 2) are repeated until all of the frames in a page are received by the second relay gateway processor 25-2 without any bit error.
4. Once all of the frames are received correctly, the second relay gateway processor 25-2 sends a receiver-not-ready (RNR) signal to the sending fax machine 11-1, by way of the first relay gateway processor 25-1.

5. The sending fax machine 11-1 sends a receiver-ready (RR) command once it receives the RNR signal as forwarded to it by the first relay gateway processor 25-1.
6. The first relay gateway processor 25-1 terminates the RR locally. At this time, if the MCF (page OK) signal has not yet been received from the second relay gateway processor 25-2, steps 3) through 5) are repeated.
7. Once the MCF signal is forwarded to the sending fax machine 11-1 (whereby it originated at the receiving fax machine 11-2), the procedure ends for the current page, and the process begins for the next page unless the current page is the last page.

While the present invention has been described with respect to the preferred embodiments, other types of configurations may be possible, while remaining within the spirit and scope of the present invention, as exemplified by the claims. For example, while the relay network has been described as a digital packet network in the first embodiment and a network that includes a satellite transmission path in the second embodiment, other types of networks, including wideband networks, may be utilized as a relay network in the fax transmission path, while remaining within the scope of the invention as described above.

For example, a frame relay network, a TDMA network, or a narrowband analog network, may be substituted for the narrowband networks described in the first, second and third embodiments. Furthermore, wideband digital networks may be substituted for the PCM-encoded networks described above for the wideband portions of the fax relay network.

Also, fax transmission over the Internet, using an Internet Protocol (e.g., IP), may be substituted for the narrowband network, thereby allowing fax transmissions over the Internet, even during high congestion times. Fax over compressed channels, fax over cellular networks, or fax over cable modems, may also be performed using the system and method according to the present invention.

What is claimed is:

1. A method of fax transmission over a fax relay network that includes at least an analog portion and a digital portion of the fax relay network, the method comprising:

receiving, at a first relay data gateway that communicatively connects a sending fax machine to the digital portion of the fax relay network, image data from the sending fax machine;

converting the image data into digital data to be sent over the digital portion of the fax relay network;

storing the digitized image data in a buffer at the first relay data gateway;

determining an amount of data stored in the buffer at the first relay data gateway; and if the determination made of the amount of data stored in the buffer is that the amount of data stored in the buffer is greater than a particular amount of data, sending a data resend signal to the sending fax machine;

outputting the digitized image data in accordance with a data rate of the digital portion of the fax relay network, the digitized image data being received by a second relay data gateway on the digital portion of the fax relay network, the second relay data gateway communicatively connecting a receiving fax machine to the digital portion of the fax relay network;

wherein the receiving fax machine operates in an error correction mode in which received data is requested to be resent to the receiving fax machine if errors are detected in the received data.

2. The method according to claim 1, wherein the sending fax machine is communicatively connected to a first public switched telephone network, the first public switched telephone network communicatively connecting the sending fax machine with the first relay data gateway.

3. The method according to claim 2, wherein the receiving fax machine is communicatively connected to a second public switched telephone network, the second public switched telephone network communicatively connecting the receiving fax machine with the second relay data gateway.

4. The method according to claim 1, wherein the image data received by the first relay data gateway is converted from pulse-code-modulated format to digital format, by the first relay data gateway, and wherein the digital data received by the second relay data gateway is converted from digital format to pulse-code-modulated format, by the second relay data gateway.

5. A method of fax transmission over a fax relay network that includes at least a wideband portion and a narrowband portion, the method comprising:

receiving, at a first relay data gateway that communicatively connects a sending fax machine to the narrowband portion of the fax relay network, image data from the sending fax machine;

storing the image data in a buffer at the first relay data gateway;

outputting the image data in accordance with a data throughput rate of the narrowband portion of the fax relay network, the image data being received by a second data gateway on the narrowband portion of the fax relay network, the second data gateway communicatively connecting a receiving fax machine to the narrowband portion of the fax relay network;

determining an amount of data stored in the buffer at the first relay data gateway; and if the determination made of the amount of data stored in the buffer is that the amount of data stored in the buffer is greater than a particular amount of data, sending a data resend signal to the sending fax machine, wherein the sending fax machine operates in an error correction mode in which a data frame is resent upon receipt of a signal to resend the data frame.

6. The method according to claim 5, wherein the sending fax machine is communicatively connected to one of a first public switched telephone network and a first private branch exchange, the one of the first public switched telephone network and the first private branch exchange communicatively connecting the sending fax machine with the first relay data gateway.

7. The method according to claim 6, wherein the receiving fax machine is communicatively connected to one of a second public switched telephone network and a second private branch exchange, the one of the second public switched telephone network and the second private branch exchange communicatively connecting the receiving fax machine with the second relay data gateway.

8. The method according to claim 5, wherein the narrowband portion is a digital network.

9. The method according to claim 8, wherein the wideband portion is an analog network.

10. The method according to claim 9, wherein the image data received by the first relay data gateway is converted from pulse-code-modulated format to digital format, by the first relay data gateway, and wherein the digital data received by the second relay data gateway is converted from digital format to pulse-code-modulated format, by the second relay data gateway.

11. A method of fax transmission over a fax relay network that includes at least an analog portion and a digital portion of the fax relay network, the method comprising:

receiving, at a first relay data gateway that communicatively connects a sending fax machine to the digital portion of the fax relay network, image data from the sending fax machine;

converting the image data into digital data to be sent over the digital portion of the fax relay network;

storing the digitized image data in a buffer at the first relay data gateway determining an amount of data stored in the buffer at the first relay data gateway; and if the determination made of the amount of data stored in the buffer is that the amount of data stored in the buffer is greater than a particular amount of data, sending a data resend signal to the sending fax machine;

outputting the digitized image data in accordance with a data rate of the digital portion of the fax relay network, the digitized image data being received by a second relay data gateway on the digital portion of the fax relay network, the second relay data gateway communicatively connecting a receiving fax machine to the digital portion of the fax relay network;

determining whether a frame of the digitized image data contains errors;

if the determining step is that the frame of the digitized image data contains errors, sending a data resend signal to the first relay data gateway; and providing the frame of the digitized image data to the second relay data gateway from one of the first relay data gateway and the sending fax machine.

12. An apparatus for facilitating fax transmission between a sending fax machine and a receiving fax machine over a fax relay network, the fax relay network including at least an analog portion and a digital portion, the apparatus comprising:

an input port for receiving image data sent from the sending fax machine;

a conversion unit that converts the image data into digital data to be sent over the digital portion of the fax relay network;

a storing unit that stores the digitized image data and that outputs it signal indicative of a particular amount of data currently stored in the storing unit; and a control unit for controlling output of the digitized image data stored in the storing unit in accordance with a data rate of the digital portion of the fax relay network and the signal output by the storing unit wherein, if the amount of data stored in the buffer is greater than a particular amount of data, the control unit sends a data resend signal to the sending fax machine, wherein the sending fax machine operates in an error correction mode in which data is resent by the sending fax machine upon receipt of the data resend signal.

13. The apparatus according to claim 12, wherein the sending fax machine is communicatively connected to a first public switched telephone network, the first public switched telephone network communicatively connecting the sending fax machine with the apparatus.

14. The apparatus according to claim 13, wherein the conversion unit converts the image data received over the first public switched telephone network and which is PCM-encoded, to digital data to be sent over the digital portion of the fax relay network.

15. An apparatus for facilitating fax transmission between a sending fax machine and a receiving fax machine over a fax relay network, the fax relay network including at least a first network portion and a second network portion, the apparatus comprising:

an input port for receiving image data sent from the sending fax machine;

a storing unit that stores the image data and that outputs a signal indicative of a particular amount of data currently stored in the storing unit; and a control unit for controlling output of the image data stored in the storing unit in accordance with a data rate of the second network portion of the fax relay network and the signal output by the storing unit wherein, if the amount of data stored in the storing unit is greater than a particular amount of data, the control unit sends a data resend signal to the sending fax machine, wherein the sending fax machine operates in an error correction mode, in which data is resent by the sending fax machine upon receipt of the data resend signal.

16. The apparatus according to claim 15, wherein the sending fax machine is communicatively connected to a first public switched telephone network, the first public switched telephone network communicatively connecting the sending fax machine with the apparatus.

17. The apparatus according to claim 15, wherein the first network portion is a network in which PCM-encoded signals are sent therethrough, and wherein the second network portion is a digital network in which digitized packets of data are sent therethrough.

18. An apparatus for facilitating fax transmission between a sending fax machine and a receiving fax machine over a fax relay network, the fax relay network including at least an analog portion and a digital portion, the apparatus comprising:

input means for receiving image data sent from the sending fax machine;

conversion means for converting the image data into digital data to be sent over the digital portion of the fax relay network;

storing means for storing the digitized image data and th-at outputs a signal indicative of a particular amount of data currently stored in the storing means, and controlling means for controlling output of the digitized image data stored in the storing means in accordance with a data rate of the digital portion of the fax relay network and the signal output by the storing means wherein, if the amount of data stored in the storing means is greater than a particular amount of data, the controlling means sends a resend signal to the sending fax machine, wherein the sending fax machine operates in an error correction mode in which data is resent by the sending fax machine upon receipt of the data resend signal.

19. The apparatus according to claim 18, wherein the sending fax machine is communicatively connected to a first public switched telephone network, the first public switched telephone network communicatively connecting the sending fax machine with the apparatus.

20. The apparatus according to claim 18, wherein the conversion means converts the image data received over the first public switched telephone network and which is PCM-encoded, to digital data to be sent over the digital portion of the fax relay network.

21. An apparatus for facilitating fax transmission between a sending fax machine and a receiving fax machine over a fax relay network, the fax relay network including at least a first network portion and a second network portion, the apparatus comprising:

input means for receiving image data sent from the sending fax machine;

storing unit for storing the image data and that outputs a signal indicative of a particular amount of data currently stored in the storing means; and controlling means for controlling output of the image data stored in the storing unit in accordance with a data rate of the second network portion of the fax relay network and the signal output by the storing means wherein, if the amount of data stored in the storing unit is greater than a particular amount of data, the control unit sends a data resend signal to the sending fax machine, wherein the sending fax machine operates in an error correction mode in which data is resent by the sending fax machine upon receipt of the data resend signal.

22. The apparatus according to claim 21, wherein the sending fax machine is communicatively connected to a first public switched telephone network, the first public switched telephone network communicatively connecting the sending fax machine with the apparatus.

23. The apparatus according to claim 21, wherein the first network portion is a network in which PCM-encoded signals are sent therethrough, and wherein the second network portion is a digital network in which digitized packets of data are sent therethrough.

24. A method of fax transmission over a fax relay network that includes at least an analog portion and a digital portion of the fax relay network, the method comprising:

receiving, at a first relay data gateway that communicatively connects a sending fax machine to the digital portion of the fax relay network, image data from the sending fax machine;

converting the image data into digital data to be sent over the digital portion of the fax relay network;

storing the digitized image data in a buffer at the first relay data gateway;

determining an amount of data stored in the buffer at the first relay data gateway; and if the determination made of the amount of data stored in the buffer is that the amount of data stored in the buffer is greater than a particular amount of data, sending a data resend signal to the sending fax machine;

outputting the digitized image data in accordance with a data rate of the digital portion of the fax relay network, the digitized image data being received by a second relay data gateway on the digital portion of the fax relay network, the second relay data gateway communicatively connecting a receiving fax machine to the digital portion of the fax relay network;

wherein the receiving fax machine operates in an error correction mode in which received data is requested to be resent to the receiving fax machine if errors are detected in the received data wherein the first relay data gateway sends the frame of the digitized image data to the second relay data gateway if the frame of the digitized image data is currently stored at the first relay data gateway, and wherein the first relay data gateway sends the frame of the digitized image data to the second relay data gateway, after requesting it from the sending fax machine, if the frame of the digitized image data is currently not stored at the first relay data gateway or if the frame of the digitized image data is current stored at the first relay data gateway but is corrupted with errors.

25. A method of fax transmission over a fax relay network that includes at least an analog portion and a digital portion of the fax relay network, the method comprising:

receiving, at a first relay data gateway that communicatively connects a sending fax machine to the digital portion of the fax relay network, image data from the sending fax machine;

converting the image data into digital data to be sent over the digital portion of the fax relay network;

storing the digitized image data in a buffer at the first relay data gateway;

outputting the digitized image data in accordance with a data rate of the digital portion of the fax relay network, the digitized image data being received by a second relay data gateway on the digital portion of the fax relay network, the second relay data gateway communicatively connecting a receiving fax machine to the digital portion of the fax relay network;

determining whether a frame of the digitized image data contains errors;

if the determining step is that the flame of the digitized image data contains errors, sending a data resend signal to the first relay data gateway; and providing the frame of the digitized image data to the second relay data gateway from one of the first relay data gateway and the sending fax machine wherein the first relay data gateway sends the frame of the digitized image data to the second relay data gateway if the frame of the digitized image data is currently stored at the first relay data gateway, and wherein the first relay data gateway sends the frame of the digitized image data to the second relay data gateway, after requesting it from the sending fax machine, if the frame of the digitized image data is currently not stored at the first relay data gateway or if the frame of the digitized image data is current stored at the first relay data gateway but is corrupted with errors.

* * * * *